(12) United States Patent
Franz et al.

(10) Patent No.: US 9,242,188 B2
(45) Date of Patent: Jan. 26, 2016

(54) LOW-LOAD DISTRIBUTOR

(71) Applicant: RVT Process Equipment GmbH, Steinwiesen (DE)

(72) Inventors: Uwe Franz, Wallenfels (DE); Werner Geipel, Steinwiesen (DE)

(73) Assignee: RVT PROCESS EQUIPMENT GMBH, Steinwiesen (DE)

( * ) Notice: Subject to any disclaimer, the term of this patent is extended or adjusted under 35 U.S.C. 154(b) by 211 days.

(21) Appl. No.: 13/913,855

(22) Filed: Jun. 10, 2013

(65) Prior Publication Data

US 2013/0328222 A1    Dec. 12, 2013

(30) Foreign Application Priority Data

Jun. 11, 2012  (DE) .......................... 10 2012 011 553

(51) Int. Cl.
*B01F 3/04*     (2006.01)
*B01D 3/00*     (2006.01)
*B01D 3/20*     (2006.01)
*B01D 53/18*    (2006.01)
*F25J 3/04*     (2006.01)

(52) U.S. Cl.
CPC *B01D 3/008* (2013.01); *B01D 3/20* (2013.01); *B01D 53/185* (2013.01); *F25J 3/04927* (2013.01)

(58) Field of Classification Search
CPC ........ B01D 3/008; B01D 53/185; B01D 3/20; F25J 3/04927
USPC ............................................ 261/74, 97, 110
See application file for complete search history.

(56) References Cited

U.S. PATENT DOCUMENTS

| 1,113,643 | A |   | 10/1914 | Jonas |       |
|-----------|---|---|---------|-------|-------|
| 2,271,671 | A |   | 2/1942  | Wlble |       |
| 3,284,068 | A | * | 11/1966 | Goettl | ............................. 261/97 |
| 4,267,978 | A |   | 5/1981  | Manteufel |  |
| 4,472,325 | A |   | 9/1984  | Robbins |    |

(Continued)

FOREIGN PATENT DOCUMENTS

| CN | 88100797 A   | 9/1998 |
|----|--------------|--------|
| DE | 33 46 857 C2 | 4/1993 |

(Continued)

OTHER PUBLICATIONS

Extended European Search Report dated Apr. 2, 2014, issued by the European Patent Office in corresponding European Patent Application No. 13002918.4-1351 / 2674206 (5 pages).
Search Report issued on Aug. 27, 2012, by the Germany Patent Office for Application No. 10 2012 011 553.9.
Extended European Search Report issued on Oct. 7, 2013, by the European Patent Office in corresponding European Patent Application No. 13002918.4-1351. (5 pages).
Jan. 27, 2015 Canadian Office Action issued in Canadian Application No. 2,818,142.
Office Action issued on Dec. 15, 2014, by the Chinese Patent Office in corresponding Chinese Patent Application No. 2013102339557.

*Primary Examiner* — Charles Bushey
(74) *Attorney, Agent, or Firm* — Buchanan Ingersoll & Rooney PC

(57) ABSTRACT

A low-load distributor is disclosed for mass transfer columns for applying liquid onto the surface of packing stages of the mass transfer columns with at least one liquid supply, a plurality of liquid dispensing points and dwell time delay devices disposed between the liquid supply and the liquid dispensing points. An exemplery low-load distributor can be easily manufactured for a very low liquid flow rate and is characterized by high operation reliability. A dwell time delay devices can include absorbent open-pored storage material and the flow resistance of the storage material can increase in the liquid flow direction, starting from the liquid supply in the direction towards the liquid dispensing points.

13 Claims, 2 Drawing Sheets

(56) References Cited

U.S. PATENT DOCUMENTS

| | | | |
|---|---|---|---|
| 4,648,972 A | 3/1987 | Ullrich et al. | |
| 4,816,191 A | 3/1989 | Berven et al. | |
| 4,846,266 A | 7/1989 | Acker et al. | |
| 4,855,089 A | 8/1989 | Michels | |
| 6,758,463 B2 * | 7/2004 | Zone et al. | 261/97 |
| 6,907,751 B2 * | 6/2005 | Kalbassi et al. | 62/617 |
| 7,060,232 B2 * | 6/2006 | Harter et al. | 422/606 |
| 7,125,004 B2 * | 10/2006 | Dollie et al. | 261/97 |
| 7,264,724 B2 * | 9/2007 | Vigna et al. | 210/321.75 |
| 7,712,728 B2 * | 5/2010 | Kehrer | 261/97 |
| 2003/0090009 A1 | 5/2003 | Zich et al. | |
| 2004/0182013 A1 | 9/2004 | Kehrer | |
| 2005/0189663 A1 | 9/2005 | Dollie et al. | |
| 2007/0035047 A1 | 2/2007 | Zich et al. | |
| 2007/0036957 A1 | 2/2007 | Zich et al. | |
| 2009/0020896 A1 | 1/2009 | Zich et al. | |
| 2012/0134886 A1 | 5/2012 | Schultes et al. | |

FOREIGN PATENT DOCUMENTS

| | | |
|---|---|---|
| DE | 100 10 810 A1 | 9/2001 |
| DE | 103 43 649 A1 | 4/2005 |
| DE | 103 43 650 A1 | 4/2005 |
| DE | 10 2004 056 419 A1 | 5/2006 |
| DE | 10 2010 009 292 A1 | 8/2011 |
| EP | 1 459 793 B1 | 7/2011 |
| WO | 2005/058746 A2 | 6/2005 |
| WO | WO 2011/015352 A1 | 2/2011 |

* cited by examiner

LOW-LOAD DISTRIBUTOR

The present invention relates to a low-load distributor for mass transfer columns for applying liquid onto the surface of packing stages of the mass transfer columns with at least one liquid supply, having a plurality of channels, where the liquid supply leads into the channels and the channels comprise exit points for the liquid, having a plurality of liquid dispensing points and dwell time delay devices disposed between the liquid supply and the liquid dispensing points.

Random packings and structured packings in mass transfer column must be irrigated by suitable liquid distribution devices. In this, the achievable separating capacity of the mass transfer column depends on the quality of the liquid distribution. To ensure intensive mass transfer between the phases, the flow of liquid is to be evenly distributed over the cross-sectional area of the column for the entire operation range. The liquid is there distributed to individual drip points. The drip points must be arranged uniformly across the cross-sectional area of the column. The same amount of liquid is to be dispensed from each drip point. In particular during low-load operation where the liquid flow rate based on the cross-sectional area of the column is at about 0.05 to 1 $m^3/(m^2h)$, uniform distribution is problematic.

A liquid distributor for low-load operation is already known from DE 33 46 857 C2. The liquid distributor comprises a pre-distribution device, connected to a supply line, which opens into a plurality of distribution devices, where the distribution devices each have at least one liquid outlet opening. The liquid outlet openings communicate with a body which is attached to the outside of the distribution device and made from absorbent, open-pore material with an internal coherent pore structure which is wettable by the liquid. The body is attached to the distribution device such that the entire liquid exiting the liquid outlet openings passes through the internal pore structure of the body before it is dispensed to the mass transfer column.

Another fine distributor is known from EP 1 459 793 B1. The fine distributor comprises a main canal which applies liquid to a plurality of fine distributor elements disposed therebeneath. Each fine distributor element comprises a canal which in its wall comprises exit openings for the liquid. A respective distribution channel is arranged below the canal extending substantially parallel to the canal. Starting out from the canal, a plane-like guide device for guiding the liquid, which exits from the outlet openings, extends to the associated distribution channel. The distribution channel is formed by two sheet-metal edges forming a gap tapering downwardly. The plane-like guide device extends through this area and forms drip points for the liquid below the distribution channel.

Further liquid distributors for applying and distributing liquids in columns for mass and/or heat transfer are shown in US 2005/0189663 A1, U.S. Pat. Nos. 4,816,191 and 1,113,643.

Also so-called flooding packings are known. Examples of these are described in WO 2011/015352 A1, DE 100 10 810 A1, DE 103 43 649 A1, DE 103 43 650 A1 and DE 10 2004 0564 19 A1. These flooding packings are a part of the structured packing arranged in a column and comprise higher flow resistance for the liquid, so that the liquid is accumulated. These flooding packings function only if there is a flow of gas flowing in the counter-current to the liquid through the column. Such flooding packings replace no primary liquid distributors with which liquid is introduced into a column.

Despite the possibilities already known, it is still difficult to achieve uniform distribution of liquid during low-load operation. It is also difficult with low-load distributors, that for a given number of drip points, the size of the bores or slots for the liquid to exit becomes extremely small. Thereby, production becomes extremely difficult, operation reliability is greatly reduced.

It is therefore the object of the present invention to provide a further improved low-load distributor that allows for uniform distribution of liquid across the cross-sectional column area of the mass transfer column, which can be easily manufactured and has good operation reliability.

For this, it is provided according to the invention, that the dwell time delay devices comprise absorbent open-pored storage material and the flow resistance of the storage material increases in the flow direction of the liquid, i.e. starting from the liquid supply in the direction of the liquid dispensing points.

Due to the increasing flow resistance of the storage material, the liquid accumulates in the low-load distributor and can not immediately flow through the liquid dispensing points. This provides good lateral distribution of the applied liquid across the cross-sectional area of the column achieving the desired uniform application of the liquid onto the entire surface of the packing stages. Primary lateral liquid distribution is achieved by the channels before entry into the dwell time delay devices.

Advantageously, it can be provided that the pore size of the storage material decreases in the direction of liquid flow. The porous storage material is wettable by the liquid and absorbent. The storage material comprises an open inner pore structure, i.e. the pores are interconnected so that the liquid can flow through the storage material. Thereby, essentially the entire liquid exiting the liquid dispensing points must have passed through the inner pore structure before exiting from the liquid dispensing points. The porous storage material is formed such that larger pores are disposed in the region of the liquid supply and the liquid can drain more rapidly. The pore size decreases towards the direction of the liquid dispensing points. The liquid accumulates. In the region of the liquid supply, the liquid can therefore drain quickly to the sides, in the region near the liquid dispensing points, good lateral distribution is achieved by the capillary effect. This results in very uniform liquid distribution across the entire cross-sectional area of the column.

Further, it can also be provided that the storage material is comprised of at least two layers and that the second layer which is disposed more distant from the liquid supply has a greater density than the first layer disposed closer to the liquid supply. The two layers therefore extend substantially laterally to the direction of flow. Each of the layers can then be formed uniformly and have a substantially constant pore size. Due to the two layers, it is very easy to change the pore size in the direction of liquid flow.

It can be provided according to a further embodiment of the invention that a first weir with liquid passages spaced apart from each other is arranged between the first layer of storage material and the second layer of storage material. In a very simple configuration, a perforated plate can be used as a weir. Due to this weir, a first lateral distribution is forced between the first layer of storage material and the second layer of storage material.

It can also be provided that a second weir having droplet passage points spaced apart from each other is arranged in the direction of liquid flow downstream of the storage material. This achieves further lateral distribution of the liquid before the final dripping onto the packing stages of the mass transfer column.

It can advantageously also be provided that the exit points for the liquid are disposed in the side walls of the channels spaced apart from the channel bottom. Thereby, a predetermined liquid level is forced in each channel, the liquid being applied point-like is distributed over the entire cross section of the channel. The raised exit points result in a long dwell time of the liquid in the channel and in a low flow speed. Impurities possibly contained in the liquid, such as solids, settle and do not flow into the mass transfer column.

The storage material can advantageously be arranged in the direction of flow downstream of the exit points. The storage material can then be easily attached to the outer sides of the side walls of the channels. The liquid flowing through the storage material is already clarified and contains only few solids so that the risk of clogging the storage material is significantly reduced.

It can be provided according to a further embodiment, that guide plates are disposed at the channels adjacent to the exit points and that the storage material is disposed between the side wall of the channel and the respective guide plate. With the guide plates, the liquid is additionally guided in the desired direction. In addition, simple attachment of the storage material is also possible.

Advantageously, the guide plates can at their ends facing away from the channels be provided with jags. These jags form drip points for the liquid. It is also conceivable that these drip points have other shapes, and, for example, are rounded.

It can be provided according to yet another embodiment, that each of the guide plates is curved forming an extension of the associated channel, the second weir extends parallel to the side wall and as an extension of the respective channel and is connected to the guide plate in the bottom region, where it is intended at the junction between the guide plate and the second weir to provide half-holes forming the droplet passage points. With these half-holes, low liquid passage is achieved, relatively easy production of the liquid passage points is possible. The number and the arrangement of the half-holes already correspond to the final geometry of the liquid dispensing points, i.e. the drip points.

Good guidance of the liquid to the desired liquid dispensing points can be achieved in that the guide plate comprises grooves for guiding the liquid, where the grooves extend from the half-holes to the liquid dispensing points.

It can be provided in yet another embodiment that each of the guide plates is at its upper end provided with emergency overflow apertures. This achieves uniform distribution of the liquid across the entire channel length and thereby across the entire cross-sectional area of the column also when the distributor overflows.

It can further also be provided that an upper drip centering plate is disposed in the flow direction upstream of the storage material. This drip centering plate achieves lateral distribution before the liquid enters the storage material.

It can be provided in a further embodiment that each of the channels can be leveled individually. With this leveling option for each channel, exact horizontal alignment of each channel is achieved. There are therefore no differences within the individual channels with respect to their liquid level which allows for the liquid to be dispensed in a very uniform manner. Quality degradation in the liquid distribution is thereby avoided.

The invention is further illustrated in more detail using the drawings.

Figure 1:
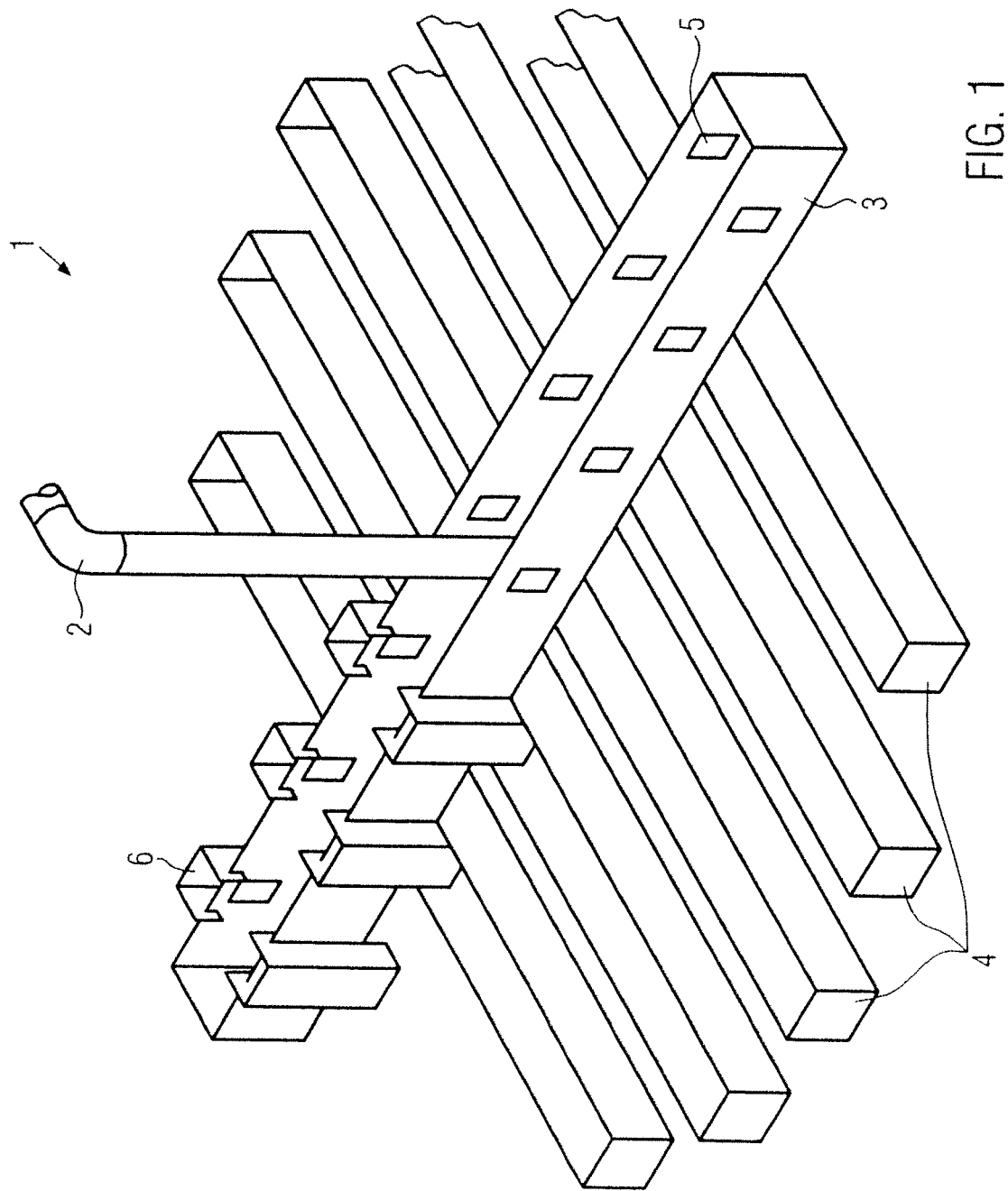
FIG. 1 shows a schematic representation of a liquid distributor.

FIG. 1 shows a schematic illustration of a low-load distributor 1. The low-load distributor 1 is used for uniform application of liquid onto the surface of packing stages of mass transfer columns which are operated in low-load operation. Low-load operation is presently to be understood in that the liquid flow rate relative to the cross-sectional area of the column is in a range of about 0.05 to 1 $m^3/(m^2h)$. The liquid is distributed by the low-load distributor to the liquid dispensing points (drip points). The number of drip points (drip point density) is predetermined in the engineering process. A drip point density of 60 to 150/$m^2$ is common. In the mass transfer column, the liquid is brought to contact a gas flow to enable the mass transfer. In this, a surface as large as possible is to be provided on which the gas and the liquid come in contact. For this purpose, packing stages, such as random packings or structured packings, are arranged in the column.

The low-load distributor 1 comprises a liquid supply 2, in the case illustrated, only a feed pipe. The liquid supply 2 opens into a main canal 3. Channels 4 are arranged below the main canal 3 extending laterally to the main canal 3. The main canal 3 in its side walls comprises apertures 5 which are associated with the channels 4 and through which the liquid supplied in the main canal overflows into the channels 4. In the case illustrated, the apertures 5 are covered with guide structures 6 ensuring that the liquid overflows from the main canal 3 into the channels 4. The channels 4 in turn communicate with liquid dispensing points 19 (see FIGS. 2 and 3) through which the liquid is dispensed to the packing stages. Between the liquid supply 2 and the liquid dispensing points 19, dwell time delay device are arranged which ensure that the flow resistance of the liquid increases, starting from the liquid supply in the direction towards the liquid dispensing points, thereby achieving good lateral distribution of the liquid in the low-load distributor. FIG. 1 only schematically shows the low-load distributor, the dwell time delay devices are not shown.

Figure 2:
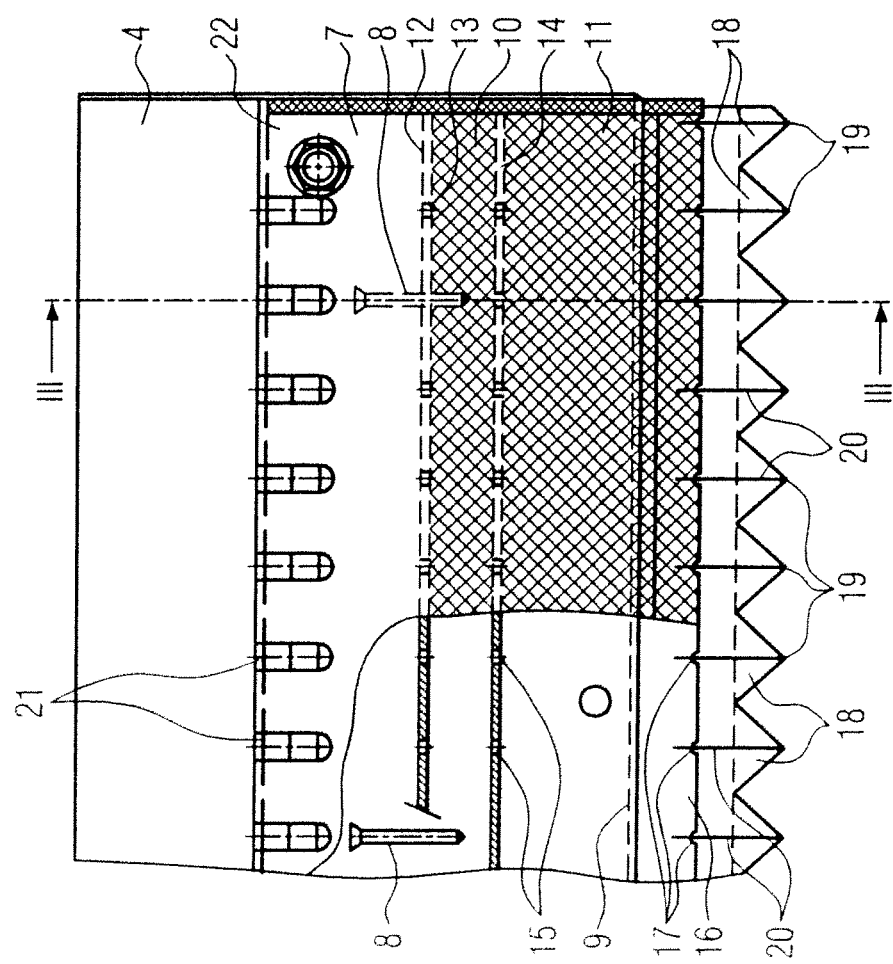
FIG. 2 shows a side view of a section of a channel of the low-load distributor according to the invention.

FIG. 2 shows an enlargement of a section of a channel 4 from FIG. 1 in a side view. The channel 4 is a U-shaped canal which is closed at both face ends. Slots 8 are formed spaced apart from each other in one of the side walls 7 of the channel 4. The slots 8 form exit points for the liquid and can also have any desired other shape, such as a circular shape, etc. Spacing of the slots 8 is determined such that, for a given liquid flow rate through the distributor, a slot width or diameter results which makes sense in terms of manufacturing. The slots 8 in the side wall 7 of the channel 4 are arranged above the channel bottom 9. The liquid entering the channel 4 must therefore first have reached a certain liquid level before it can exit through the slots 8. As a consequence, the dwell time of the liquid in the channel 4 is increased. Therefore, predetermined liquid levels are forced in the channels so that the liquid usually applied in a point-like manner is distributed across the entire cross section of the channels. This leads to very high dwell times of the liquid in the distributor, the flow velocity of the liquid is low. Solids possibly contained in the liquid can settle which reduces contamination of the subsequent components of the liquid distributor and the mass transfer column.

The channels 4 are formed such that each individual channel can be leveled. This enables exact horizontal alignment of the channels 4 and thereby of the slots 8 fitted in the channels 8. The liquid fed by the liquid supply 2 is therefore distributed in the channels 4 and exits the channels 4 through the slots 8. Storage material 10, 11 is arranged in the direction of liquid flow downstream of the slots 8. The storage material 10, 11 extends across the entire length of each channel 4. The storage material 10, 11 is absorbent open-pored material which is wettable with the supplied liquid. The storage material has an internal coherent pore structure and is absorbent, so that substantially the entire liquid flowing through the low-load distributor must flow through the internal pore structure of the storage material before it exits from the low-load distributor. Absorbent materials e.g. woven or non-woven textile material, foam, or ceramic or oxide ceramic sintered materials can be used as storage material. The materials used must of course be resistant to the conditions of use in the column and may not decompose or be melted by the substances and temperatures employed.

The storage material 10, 11 is designed such that the flow resistance of the liquid increases. This can e.g. be done in that the pore size of the storage material decreases in the direction of liquid flow. Therefore, the storage material comprises a first layer 10 and second layer 11. The first layer 10 is arranged in the direction of liquid flow upstream of the second layer 11 and downstream of the slots 8. The first layer 10 has a lower density than the second layer 11. Therefore, the liquid flowing in can in the first layer 10 spread laterally faster than in the second layer 11. In the second layer 11, the density is higher, and therefore the pore size is smaller. This results in lateral distribution due to the capillary effect. A drip centering plate 12 is disposed upstream of the first layer 10. The drip centering plate 12 comprises passages 13 spaced apart from each other through which the liquid exiting from the slots 8 overflows to the first layer 10.

Further, a guide plate 22 is mounted on the side wall 7 of each channel 4. The guide plate 22 can be seen especially well in FIG. 3. The guide plate 22 also extends essentially across the entire length of each channel 4. A first weir 14 is disposed between the first layer of storage material 10 and the second layer 11 of storage material. This weir 14 comprises liquid passages 15 spaced apart from each other. Due to this weir 14, further lateral distribution of the liquid is enabled between the first layer 10 and the second layer 11. A second weir 16 is mounted in the direction of flow downstream of the second layer 11 of storage material. The second weir 16 extends parallel to the side wall 7 of the channel 4 and is connected to the channel bottom 9 as well as to the guide plate 22. In the lower region, this second weir 16 comprises droplet passage points 17 spaced apart from each other. In the example shown, the droplet passage points 17 have the shape of semicircles. The guide plate 22 extends further downwardly and is at its bottom provided with jags 18. The tips of the jags 18 form the liquid dispensing points 19 for the liquid flowing through the distributor. Furthermore, the guide plate 22 is provided with grooves 20 extending from the droplet passage points 17 to the liquid dispensing points 19. Due to these grooves 20 the liquid is guided from the second weir 16 and the droplet passage points 17 disposed therein to the liquid dispensing points 19. The geometry of the liquid dispensing points 19 is determined by the packing stage arranged underneath the distributor 1.

Figure 3:
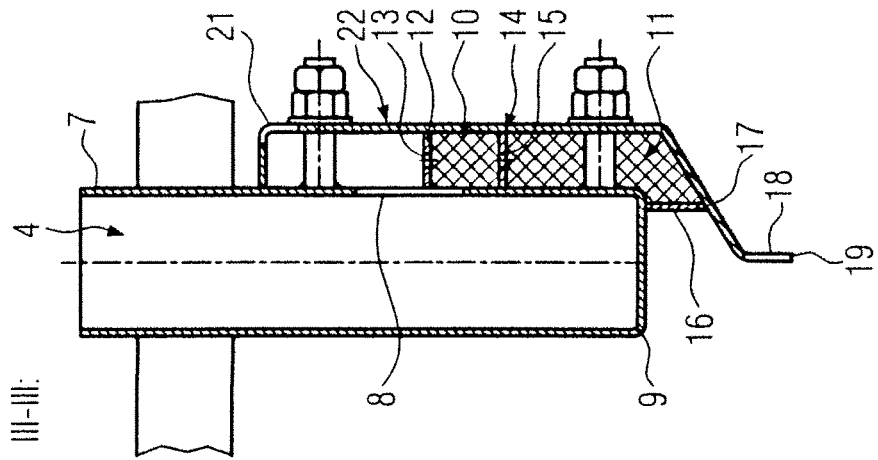
FIG. 3 shows a sectional view through the channel of FIG. 2 along the line III-III.

FIG. 3 shows a sectional view through the channel 4 of FIG. 2 along the line III-III. It is clearly evident that the channel 4 has a U-shaped cross section with side walls 7 and a channel bottom 9. The lateral slots 8 are arranged spaced from the channel bottom 9. The guide plate 22 is attached to the side wall 7 of the channel 4 in which also the slots 8 are arranged. In the upper region, the guide plate 22 extends substantially perpendicularly outwardly from the side wall 7 of the channel 4, then bends downwards and extends parallel to the side wall 7 of the channel 4. In the region of the bend, an emergency overflow 21 is arranged so that in the event of excessive liquid supply, the liquid can exit through this emergency overflow. The guide plate 22 extends parallel to the side wall 7 of the channel 4 and protrudes downwardly a little beyond the channel bottom 9. There, the guide plate again bends in the direction of the channel 4, where the angle between the portion extending in parallel and the slanted portion is an obtuse angle. The guide plate 22 is continued until it extends to about the center of the channel and there bends such that it extends vertically downwardly and runs approximately parallel to the side wall 7 of the channel 4. The guide plate 22 therefore forms a box-shaped portion adjacent to the channel in the shape of a second channel. The storage material 10, 11 is fitted in this box-shaped portion.

A drip centering plate 12 extends above the first layer 10 of storage material between the side wall 7 of the channel 4 and the guide plate 22. The drip centering plate 12 extends substantially perpendicular to the side wall 7 and therefore parallel to the channel bottom 9. The drip centering plate 12 is provided with liquid passages 13 spaced apart from each other. For example, a perforated plate can be used. The drip centering plate is arranged at the height of the slots 8 and can be spaced upwardly from the bottom edge of the slots 8. Liquid exiting through the slots 8 therefore flows to the drip centering plate 12, is transversely distributed and enters the first layer 10 of storage material through the liquid passages 13.

A first weir 14 is disposed between the first layer 10 of storage material and the second layer 11 of storage material. This first weir 14 also comprises liquid passages 15 spaced apart from each other so that this weir achieves further transverse liquid distribution. The weir 14 extends parallel to the drip centering plate 12. This weir 14 can also be easily made from a perforated plate.

As already described, the second layer 11 of storage material has a greater density than the first layer 10 of storage material. The pore size of the second layer 11 of storage material is smaller than that of the first layer 10, the flow resistance of the liquid through this second layer 11 is therefore greater. Further lateral distribution of the liquid flowing through the distributor 1 is achieved in the second layer 11 of storage material due to the capillary effect. The layer thickness of the second layer 11 of storage material is larger than the layer thickness of the first layer 10 of storage material and corresponds to approximately two to three times the layer thickness of the first layer 10 of storage material.

The second weir 16 is arranged in the direction of flow downstream of the second layer 11 of storage material. The second weir 16 extends below the channel 4 substantially parallel to the side wall 7 and is at one end connected to the channel 4 and at the other end to the guide plate 22. The second weir 16 is provided with droplet passage points 17 in the bottom region, i.e. at the connection to the guide plate 22. The number and the arrangement of the droplet passage points 17 corresponds to the final geometry of the liquid dispensing points. The droplet passage points 17 are preferably semi-circular. At its lower end, the guide plate 22 has a jagged shape, as can be clearly seen in FIG. 2. On the inner side of the guide plate 22, grooves 20 are formed which connect the droplet passage points 17 with the tips of the jags 18 and thereby effect guidance of the liquid. The final liquid dispensing points 19 are formed by the tips of the jags 18. Due to the interaction of the devices described, i.e. the channels 4, the drip centering plate 12, the two layers 10, 11 of storage material, the two weirs 14, 16, the grooves 20 and the jags 18, the dwell time of the liquid in the low-load distributor is extended and the liquid is evenly distributed across the cross-sectional area of the column.

The invention claimed is:

1. Low-load distributor for mass transfer columns for applying liquid onto the surface of packing stages of the mass transfer columns comprising:
   at least one liquid supply,
   a plurality of channels, where said liquid supply leads into said channels and said channels include exit points for said liquid,
   a plurality of liquid dispensing points and
   dwell time delay devices disposed between said liquid supply and said liquid dispensing points, wherein said dwell time delay devices include absorbent open-pored storage material and a flow resistance of said storage material increases in a flow direction of said liquid, from said liquid supply in a direction towards said liquid dispensing points,
   wherein said storage material is comprised of at least two layers, and a second layer disposed more distant from said liquid supply has a greater density than a first layer disposed closer to said liquid supply and wherein a first weir having liquid passages spaced from each other is disposed between said first layer of storage material and said second layer of storage material.

2. Low-load distributor according to claim 1, comprising:
   a pore size of said storage material which decreases in the direction of liquid flow.

3. Low-load distributor according to claim 1, comprising:
   a second weir having droplet passage points spaced apart from each other, arranged in a direction of liquid flow downstream of said storage material.

4. Low-load distributor according to claim 3, wherein said exit points for said liquid are disposed in side walls of said channels spaced apart from a channel bottom.

5. Low-load distributor according to claim 1, wherein said storage material is arranged in a direction of flow downstream of said exit points.

6. Low-load distributor according to claim 4, comprising:
   guide plates fitted at said channels spaced apart from said exit points, said storage material being disposed between a respective side wall and an associated guide plate.

7. Low-load distributor according to claim 6, wherein said guide plates, at ends facing away from said channels, comprise:
   jags.

8. Low-load distributor according to claim 6, wherein each guide plate is curved forming an extension of said associated channel, said second weir extends parallel to said side wall and as an extension of the respective channel and is connected to said guide plate in a bottom region, where a junction between said guide plate and said second weir comprises:
   half-holes forming said droplet passage points.

9. Low-load distributor according to claim 8, wherein said guide plates comprise:
   grooves for liquid guidance, where said grooves extend from said half-holes to said liquid dispensing points.

10. Low-load distributor according to claim 6, wherein each of the guide plates comprises:
    an upper end provided with emergency overflow apertures.

11. Low-load distributor according to claim 1, comprising:
    an upper drip centering plate disposed in a flow direction upstream of said storage material.

12. Low-load distributor according to claim 1, wherein each of said channels is configured to be leveled individually.

13. Low-load distributor according to claim 1, wherein said exit points for said liquid are disposed in side walls of said channels spaced apart from a channel bottom.

* * * * *